(12) United States Patent
Kawaguchi et al.

(10) Patent No.: US 9,102,805 B2
(45) Date of Patent: Aug. 11, 2015

(54) MASTERBATCH FOR FOAM MOLDING AND MOLDED FOAM

(75) Inventors: Yasuhiro Kawaguchi, Yamaguchi (JP); Yoshiyuki Kosaka, Osaka (JP); Kenichi Matsumura, Yamaguchi (JP)

(73) Assignee: Sekisui Chemical Co., Ltd., Osaka (JP)

( * ) Notice: Subject to any disclaimer, the term of this patent is extended or adjusted under 35 U.S.C. 154(b) by 35 days.

(21) Appl. No.: 13/056,203

(22) PCT Filed: Sep. 16, 2009

(86) PCT No.: PCT/JP2009/066151
§ 371 (c)(1),
(2), (4) Date: Mar. 14, 2011

(87) PCT Pub. No.: WO2010/038615
PCT Pub. Date: Apr. 8, 2010

(65) Prior Publication Data
US 2011/0166242 A1 Jul. 7, 2011

(30) Foreign Application Priority Data
Sep. 30, 2008 (JP) ................................ 2008-254702

(51) Int. Cl.
*C08J 9/16* (2006.01)
*C08J 9/18* (2006.01)
*C08J 9/32* (2006.01)

(52) U.S. Cl.
CPC .............. *C08J 9/32* (2013.01); *C08J 2201/024* (2013.01); *C08J 2203/22* (2013.01); *C08J 2323/06* (2013.01); *C08J 2323/12* (2013.01); *C08J 2325/06* (2013.01)

(58) Field of Classification Search
USPC ............................................. 521/56, 59, 60
See application file for complete search history.

(56) References Cited

U.S. PATENT DOCUMENTS

| | | | | |
|---|---|---|---|---|
| 2,787,809 A | * | 4/1957 | Stastny | 264/53 |
| 2,986,537 A | * | 5/1961 | Chaumeton | 521/58 |
| 3,615,972 A | * | 10/1971 | Morehouse et al. | 156/79 |
| 4,287,308 A | * | 9/1981 | Nakayama et al. | 521/53 |
| 4,624,969 A | * | 11/1986 | Treptow et al. | 521/60 |
| 4,689,355 A | * | 8/1987 | Treptow et al. | 521/154 |
| 4,737,407 A | * | 4/1988 | Wycech | 428/323 |
| 4,785,024 A | * | 11/1988 | Sakata et al. | 521/60 |
| 5,302,427 A | * | 4/1994 | Murschall et al. | 428/34.2 |
| 5,536,756 A | * | 7/1996 | Kida et al. | 521/56 |
| 6,040,348 A | * | 3/2000 | Delaite et al. | 521/59 |
| 6,235,394 B1 | * | 5/2001 | Shimazawa et al. | 428/402.21 |
| 6,261,490 B1 | * | 7/2001 | Kliene | 264/45.7 |
| 6,476,089 B1 | * | 11/2002 | Maletzko et al. | 521/60 |
| 6,582,633 B2 | * | 6/2003 | Elfving et al. | 264/53 |
| 6,593,383 B2 | * | 7/2003 | Yanagihara et al. | 521/58 |
| 6,761,843 B2 | * | 7/2004 | Horiuchi et al. | 264/53 |
| 6,930,132 B2 | * | 8/2005 | Coppini et al. | 521/59 |
| 6,984,347 B2 | * | 1/2006 | Masuda et al. | 264/4.33 |
| 7,579,384 B2 | * | 8/2009 | Matsumura et al. | 521/56 |
| 7,786,181 B2 | * | 8/2010 | Nordin et al. | 521/55 |
| 7,956,096 B2 | * | 6/2011 | Nordin et al. | 521/56 |
| 8,058,320 B2 | * | 11/2011 | Ejiri et al. | 521/56 |
| 8,088,482 B2 | * | 1/2012 | Glorioso et al. | 428/402 |
| 2001/0016610 A1 | * | 8/2001 | Maletzko et al. | 521/56 |
| 2002/0135084 A1 | | 9/2002 | Ohmura et al. | |
| 2003/0091843 A1 | * | 5/2003 | Murschall et al. | 428/480 |
| 2005/0164022 A1 | * | 7/2005 | Kliesch et al. | 428/474.4 |
| 2005/0249947 A1 | * | 11/2005 | Wittmann | 428/357 |
| 2006/0063000 A1 | * | 3/2006 | Tokumura et al. | 428/402.2 |
| 2006/0269712 A1 | * | 11/2006 | Palmlof | 428/36.9 |
| 2007/0112081 A1 | * | 5/2007 | Hahn et al. | 521/56 |
| 2007/0142485 A1 | * | 6/2007 | Nordin et al. | 521/54 |
| 2007/0208093 A1 | * | 9/2007 | Nordin et al. | 521/56 |
| 2007/0219281 A1 | * | 9/2007 | Ejiri et al. | 521/56 |
| 2007/0227814 A1 | * | 10/2007 | Schabel, Jr. | 181/288 |
| 2008/0207434 A1 | * | 8/2008 | Martinez et al. | 502/62 |
| 2009/0149559 A1 | * | 6/2009 | Masuda et al. | 521/56 |

(Continued)

FOREIGN PATENT DOCUMENTS

| | | |
|---|---|---|
| EP | 1 149 628 | 10/2001 |
| EP | 1 508 604 | 2/2005 |

(Continued)

OTHER PUBLICATIONS

Machine translation of claims and detailed description of JP 2009-203451 from Japan Patent Office.*
Product Specification for Expancel® MB Microspheres, 2011, Azko Nobel, Issue Nov. 2011.*
International Search Report issued Nov. 17, 2009 in International (PCT) Application No. PCT/JP2009/066151.

(Continued)

*Primary Examiner* — Melissa Rioja
(74) *Attorney, Agent, or Firm* — Wenderoth, Lind & Ponack, L.L.P.

(57) ABSTRACT

The present invention has its object to provide a masterbatch for foam molding, which can be suitably used for molding processes involving high shearing force, such as kneading molding, calender molding, extrusion molding, and injection molding, which shows a high expansion ratio, and which yields a foamed product with a good appearance. The present invention also has its object to provide a foamed product using the masterbatch for foam molding.

A masterbatch for foam molding comprises a base resin and a thermally expandable microcapsule, the base resin being a thermoplastic resin having a melting point of 100° C. or higher, the masterbatch containing 10 to 230 parts by weight of the thermally expandable microcapsule to 100 parts by weight of the base resin, and the masterbatch having a true density of 0.80 g/cm³ or more, a bulk density of 0.35 g/cm³ or more, and a masterbatch size of 450 mg/30 pieces or more.

7 Claims, No Drawings

(56) References Cited

U.S. PATENT DOCUMENTS

| | | | |
|---|---|---|---|
| 2009/0292031 A1 | 11/2009 | Ejiri | |
| 2010/0190877 A1* | 7/2010 | Schips et al. | 521/59 |
| 2011/0203756 A1* | 8/2011 | Nordin et al. | 162/164.6 |

FOREIGN PATENT DOCUMENTS

| | | |
|---|---|---|
| EP | 1 598 405 | 11/2005 |
| GB | 1044680 | 12/1963 |
| JP | 42-26524 | 12/1962 |
| JP | 5-15499 | 3/1993 |
| JP | 10-212372 | 8/1998 |
| JP | 2894990 | 3/1999 |
| JP | 11-343362 | 12/1999 |
| JP | 2000-178372 | 6/2000 |
| JP | 2002-264173 | 9/2002 |
| JP | 2005-212377 | 8/2005 |
| JP | 2006-2133 | 1/2006 |
| JP | 2006-045532 | 2/2006 |
| JP | 2006-282899 | 10/2006 |
| JP | 2007-191690 | 8/2007 |
| JP | 2008-133366 | 6/2008 |
| JP | 2009-120660 | 6/2009 |
| JP | 2009-161698 | 7/2009 |
| JP | 2009-203451 | 9/2009 |
| JP | 2009-221429 | 10/2009 |
| WO | 99/43758 | 9/1999 |
| WO | 03/099955 | 12/2003 |
| WO | 2004/074396 | 9/2004 |
| WO | WO-2007974773 A1 * | 5/2007 |
| WO | 2007/072769 | 6/2007 |

OTHER PUBLICATIONS

International Search Report mailed Dec. 22, 2009 in International (PCT) Application No. PCT/JP2009/066152.

Concise Encyclopedia of Polymer Science and Engineering, 1994, pp. 106-107, with partial English language translation.

Expancel Microspheres Product Specification, Expancel MB, "Masterbatch with Unexpanded Microspheres", Apr. 2007.

Expancel® DU Product Specification, Dry Unexpanded Microspheres, issued Aug. 2005.

Masahiko Yamagata, "Studies on characteristics of thermal expandable microcapsule "Advancell® EM" and its use in weight reduction", Sekisui Chemical Co., Ltd., Specialty Chemicals Division, with partial translation thereof.

* cited by examiner

MASTERBATCH FOR FOAM MOLDING AND MOLDED FOAM

This application is a U.S. national stage of International Application No. PCT/JP2009/066151 filed Sep. 16, 2009.

TECHNICAL FIELD

The present invention relates to a masterbatch for foam molding, which can be suitably used for molding processes involving high shearing force, such as kneading molding, calender molding, extrusion molding, and injection molding, which shows a high expansion ratio, and which yields a foamed product with a good appearance. The present invention also relates to a foamed product using the masterbatch for foam molding.

BACKGROUND ART

A plastic foam is used for various applications because it exerts heat-shielding properties, heat-insulating properties, sound-shielding properties, sound-absorbing properties, damping properties, reduction in weight, and the like, according to the material of the foam and the state of formed bubbles. Such a plastic foam may be produced by a method in which a masterbatch containing a chemical foaming agent is foamed with heating to mold the plastic foam. However, handling thereof was problematically difficult, for example, in that the masterbatch containing a chemical foaming agent may not foam even after being heated, and the foaming agent may decompose rapidly in an injection foam-molding machine. Moreover, since some resins fail to provide a sufficient expansion ratio, a desired hardness as a molding product may be less likely to be obtained.

Patent Document 1 discloses that an injection foamed product having a high hardness and expansion ratio and containing uniform bubbles is obtained from any resin by using a masterbatch pellet of an ethylene-α-olefin copolymer containing a chemical foaming agent.

However, chemical foaming agents decomposed by heating simultaneously generate decomposed gas and a foaming residue, and the residue remaining in the molding product sometimes affects the adhesion performance of the molding product. Moreover, upon use of chemical foaming agents, not all of the bubbles of a foamed product serve as closed cells but some of the bubbles inevitably serve as open cells. A foamed product having high airtightness is, problematically, less likely to be obtained.

Patent Document 2 discloses a foamed resin masterbatch in which polyolefin resin or styrene resin is used as a base resin, and a thermally expandable microcapsule, instead of a chemical foaming agent, is used as a foaming agent.

However, upon use of the thermally expandable microcapsule described in Patent Document 2, the expansion ratio of the foam to be obtained is low, resulting in difficulty in forming closed cells of the foam to be obtained at a certain size.

Patent Document 3 discloses a method for producing a foam composite panel by foaming and molding a resin composition obtained by blending a masterbatch containing a thermally expandable microcapsule with a masterbatch containing a chemical foaming agent.

However, even in the case of such a method, the expansion ratio of the molding product is low, and performances, such as a desired lightness and heat insulation, are not obtained although the expansion ratio is somewhat improved. Moreover, it is difficult to obtain a molding product having a good appearance.

Patent Document 4 discloses a synthetic resin composition containing a thermally expandable microcapsule and a base resin, and a production method thereof. Such a synthetic resin composition contains a base resin having a melt flow rate within a predetermined range. Therefore, the thermally expandable microcapsule is excellently miscible and compatible with the base resin without breaking the shell of the thermally expandable microcapsule.

Patent Document 1: Japanese Kokai Publication 2000-178372 (JP-A 2000-178372);
Patent Document 2: Japanese Kokai Publication Hei-11-343362 (JP-A Hei-11-343362);
Patent Document 3: Japanese Kokai Publication 2005-212377 (JP-A 2005-212377);
Patent Document 4: Japanese Kokai Publication 2002-264173 (JP-A 2002-264173)

DISCLOSURE OF THE INVENTION

Problems to be Solved by the Invention

The present invention has its object to provide a masterbatch for foam molding, which can be suitably used for molding processes involving high shearing force, such as kneading molding, calender molding, extrusion molding, and injection molding, which shows a high expansion ratio, and which yields a foamed product with a good appearance. The present invention also has its object to provide a foamed product using the masterbatch for foam molding.

Means for Solving the Problems

The present invention relates to a masterbatch for foam molding, which comprises a base resin and a thermally expandable microcapsule, the base resin being a thermoplastic resin having a melting point of 100° C. or higher, the masterbatch containing 10 to 230 parts by weight of the thermally expandable microcapsule to 100 parts by weight of the base resin, and the masterbatch having a true density of 0.80 g/cm$^3$ or more, a bulk density of 0.35 g/cm$^3$ or more, and a masterbatch size of 450 mg/30 pieces or more.

Hereinafter, the present invention will be described in detail.

As a result of earnest investigations, the present inventors have found that use of a thermoplastic resin having a melting point of 100° C. or higher as a base resin and a thermally expandable microcapsule as a foaming component in a masterbatch for foam molding each in a predetermined amount provides a foamed product, which can be suitably used for molding processes involving high shearing force, such as kneading molding, calender molding, extrusion molding, and injection molding, which shows a high and stable expansion ratio, leading to completion of the present invention.

The masterbatch for foam molding of the present invention contains a base resin.

In the present invention, a thermoplastic resin, etc. having a melting point of 100° C. or higher is used as the base resin.

If the melting point of the base resin is less than 100° C., the base resin in the masterbatch melts near a material-charging hopper of a cylinder of an injection machine or an extruder. The released thermally expandable microcapsule is more likely to expand earlier by heat of the cylinder. Thus, the thermally expandable microcapsule is not uniformly dispersed in a matrix resin such as a thermoplastic resin, resulting in a poor appearance of the molded product or a low expansion ratio of the masterbatch. The desirable lower limit thereof is 105° C., and the desirable upper limit thereof is 170° C.

The melting point is measured by DSC (differential scanning calorimetry), for example.

Example of the thermoplastic resin include typical thermoplastic resins, such as polyvinyl chloride, polypropylene, polypropylene oxide, low-density polyethylene, high-density polyethylene, and polystyrene; and engineering plastics, such as polybutylene terephthalate, nylon, polycarbonate, and polyethylene terephthalate. Thermoplastic elastomers, such as ethylene elastomers, vinyl chloride elastomers, olefin elastomers, urethane elastomers, and ester thermoplastic elastomers, may be used. Alternatively, these resins may be used in combination. Desirable among these is at least one selected from the group consisting of low-density polyethylene, high-density polyethylene, polypropylene, and polystyrene.

The desirable lower limit of the amount of the base resin in the masterbatch for foam molding of the present invention is 30% by weight, and the desirable upper limit thereof is 70% by weight. If the amount of the base resin is less than 30% by weight, the thermally expandable microcapsule foams upon production of a masterbatch, and may not be masterbatched. If the amount of the base resin exceeds 70% by weight, a desired expansion ratio may not be obtained.

The masterbatch for foam molding of the present invention contains a thermally expandable microcapsule.

The lower limit of the amount of the thermally expandable microcapsule in the masterbatch for foam molding of the present invention is 10 parts by weight, and the upper limit thereof is 230 parts by weight, to 100 parts by weight of the base resin. If the amount of the thermally expandable microcapsule is less than 10 parts by weight, a desired expansion ratio is not obtained. If the amount of the thermally expandable microcapsule exceeds 230 parts by weight, the concentration of the foaming agent in the masterbatch for foam molding is excessive. The thermally expandable microcapsule foams upon production of a masterbatch, and the masterbatch may not be produced. Alternatively, even if the masterbatch is produced, the masterbatch slightly expands, and the expansion ratio of a foamed product is consequently low. The desirable lower limit of the amount of the thermally expandable microcapsule is 20 parts by weight, and the desirable upper limit thereof is 150 parts by weight, to 100 parts by weight of the base resin.

The shell of the thermally expandable microcapsule desirably comprises a polymer obtained by polymerizing a monomer mixture which contains at least one polymerizable monomer (I) selected from the group consisting of acrylonitrile, methacrylonitrile, and vinylidene chloride.

Addition of the polymerizable monomer (I) improves gas barrier properties of the shell.

For improvement of heat resistance as well as gas barrier properties, the shell of the thermally expandable microcapsule desirably comprises a polymer obtained by polymerizing a monomer mixture that contains: 40 to 90% by weight of at least one polymerizable monomer (I) selected from the group consisting of acrylonitrile, methacrylonitrile, and vinylidene chloride; and 5 to 50% by weight of a radically-polymerizable unsaturated $C_{3-8}$ carboxylic acid monomer (II) having a carboxyl group.

The desirable lower limit of the amount of the polymerizable monomer (I) in the monomer mixture is 40% by weight, and the desirable upper limit thereof is 90% by weight. If the amount of the polymerizable monomer (I) in the monomer mixture is less than 40% by weight, the shell may have poor gas barrier properties, likely resulting in a low expansion ratio. An amount of the polymerizable monomer (I) in the monomer mixture exceeding 90% by weight may not increase heat resistance. The more desirable lower limit of the amount of the polymerizable monomer (I) in the monomer mixture is 50% by weight, and the more desirable upper limit thereof is 80% by weight.

As the radically-polymerizable unsaturated $C_{3-8}$ carboxylic acid monomer (II) having a carboxyl group, a monomer having one or more free carboxyl groups per molecule for ionic crosslinking may be used. Specific examples thereof include unsaturated monocarboxylic acids, such as acrylic acid, methacrylic acid, ethacrylic acid, crotonic acid, and cinnamic acid; unsaturated dicarboxylic acids, such as maleic acid, itaconic acid, fumaric acid, citraconic acid, and chloromaleic acid, and anhydrides thereof; and monoesters of unsaturated dicarboxylic acids, such as monomethyl maleate, monoethyl maleate, monobutyl maleate, monomethyl fumarate, monoethyl fumarate, monomethyl itaconate, monoethyl itaconate, and monobutyl itaconate, and derivatives thereof. These may be used independently, or two or more thereof may be used in combination. Particularly desirable among these are acrylic acid, methacrylic acid, maleic acid, maleic anhydride, and itaconic acid.

The amount of a segment derived from the unsaturated $C_{3-8}$ carboxylic acid monomer (II) having a carboxyl group in the monomer mixture is desirably 5% by weight in the lower limit, and 50% by weight in the upper limit. If the amount of the segment derived from the radically-polymerizable unsaturated $C_{3-8}$ carboxylic acid monomer (II) is less than 5% by weight, the maximum foaming temperature may be 190° C. or less. When the amount of the segment derived from the radically-polymerizable unsaturated $C_{3-8}$ carboxylic acid monomer (II) is more than 50% by weight, the maximum foaming temperature is increased, but the expansion ratio is reduced. More desirably, the amount of the segment derived from the radically-polymerizable unsaturated carboxylic acid monomer (II) in the monomer mixture is 10% by weight in the lower limit, and 40% by weight in the upper limit.

The monomer mixture is not particularly limited as long as the amounts of the polymerizable monomer (I) and the segment derived from the radically-polymerizable unsaturated $C_{3-8}$ carboxylic acid monomer (II) having a carboxyl group are within the aforementioned ranges. The below-mentioned monomer mixtures (1) to (3) are desirably used.

The monomer mixture (1) contains: 40 to 90% by weight of at least one polymerizable monomer (I) selected from the group consisting of acrylonitrile, methacrylonitrile, and vinylidene chloride; and 5 to 50% by weight of the radically-polymerizable unsaturated $C_{3-8}$ carboxylic acid monomer (II) having a carboxyl group, and the monomer mixture (1) is free from a polymerizable monomer (III) having two or more double bonds in a molecule.

The monomer mixture (1) is free from a polymerizable monomer (III) having two or more double bonds in a molecule in the monomer mixture. The polymerizable monomer (III) is commonly used as a crosslinking agent.

Since the monomer mixture (1) contains a monomer mixture containing a predetermined amount of the polymerizable monomer (I) and the radically-polymerizable unsaturated carboxylic acid monomer (II), a shell having sufficient strength is obtained. Thus, even when the monomer mixture is free from the polymerizable monomer (III) having two or more double bonds in a molecule, a thermally expandable microcapsule having excellent shear resistance, heat resistance, and foaming properties can be obtained. The reason why the shell has sufficient strength as mentioned above is not clear, but crosslinking by the dehydration condensation between carboxyl groups presumably has an influence on the shell strength.

If the polymerizable monomer (III) is added, the particle shape of the thermally expandable microcapsule is distorted, resulting in reduction in bulk density. The reduction in bulk density is likely to cause shearing on the thermally expandable microcapsule upon producing a masterbatch pellet in the subsequent process especially by extrusion molding. Thus, the thermally expandable microcapsule foams, a masterbatch shows problems such as poor true density, and a stable masterbatch fails to be produced. Consequently, the subsequent foam molding by injection molding or the like molding technique tends to cause unstableness of the expansion ratios.

As thus described, the monomer mixture (1) enables the thermally expandable microcapsule having sufficient strength and heat resistance to be obtained without the polymerizable monomer (III) having two or more double bonds in a molecule. The phrase "the monomer mixture free from the polymerizable monomer (III) having two or more double bonds in a molecule" used herein refers to a monomer mixture substantially free from the polymerizable monomer (III), and a monomer mixture containing only a small amount of the polymerizable monomer (III) is regarded as a monomer mixture free from the polymerizable monomer (III).

As the polymerizable monomer (III), a monomer having two or more radically-polymerizable double bonds may used. Specific examples thereof include divinylbenzene, ethylene glycol di(meth)acrylate, diethylene glycol di(meth)acrylate, triethylene glycol di(meth)acrylate, propylene glycol di(meth)acrylate, 1,4-butanediol di(meth)acrylate, 1,6-hexanediol di(meth)acrylate, 1,9-nonanediol di(meth)acrylate, polyethylene glycol di(meth)acrylate having a molecular weight of 200 to 600, glycerin di(meth)acrylate, trimethylolpropane di(meth)acrylate, trimethylolpropane tri(meth)acrylate, ethylene oxide-modified trimethylolpropane tri(meth)acrylate, pentaerythritol tri(meth)acrylate, triallyl formal tri(meth)acrylate, pentaerythritol tetra(meth)acrylate, dipentaerythritol hexa(meth)acrylate, and dimethylol-tricyclodecane di(meth)acrylate.

The monomer mixture (2) contains: 40 to 90% by weight of at least one polymerizable monomer (I) selected from the group consisting of acrylonitrile, methacrylonitrile, and vinylidene chloride; 5 to 50% by weight of the radically-polymerizable unsaturated $C_{3-6}$ carboxylic acid monomer (II) having a carboxyl group; 0.2% by weight or less of the polymerizable monomer (III) having two or more double bonds in a molecule; and 0.1 to 10% by weight of a metal cation hydroxide (IV).

The monomer mixture (2) desirably contains the polymerizable monomer (III) having two or more double bonds in a molecule. The polymerizable monomer (III) serves as a crosslinking agent.

The monomer mixture containing the polymerizable monomer (III) strengthens the shell, and is less likely to cause cell walls to burst upon thermal expansion.

The polymerizable monomer (III) is not particularly limited as long as it is different from the radically-polymerizable unsaturated $C_{3-8}$ carboxylic acid monomer (II) having a carboxyl group, and a monomer having two or more radically-polymerizable double bonds is commonly suitably used. Specific examples thereof include divinylbenzene, ethylene glycol di(meth)acrylate, diethylene glycol di(meth)acrylate, triethylene glycol di(meth)acrylate, propylene glycol di(meth)acrylate, 1,4-butanediol di(meth)acrylate, 1,6-hexanediol di(meth)acrylate, 1,9-nonanediol di(meth)acrylate, polyethylene glycol di(meth)acrylate having a molecular weight of 200 to 600, glycerin di(meth)acrylate, trimethylolpropane di(meth)acrylate, trimethylolpropane tri(meth)acrylate, ethylene oxide-modified trimethylolpropane tri(meth)acrylate, pentaerythritol tri(meth)acrylate, triallyl formal tri(meth)acrylate, pentaerythritol tetra(meth)acrylate, dipentaerythritol hexa(meth)acrylate, and dimethylol-tricyclodecane di(meth)acrylate.

The desirable upper limit of the amount of the polymerizable monomer (III) in the monomer mixture (2) is 0.2% by weight. More than 0.2% by weight of the polymerizable monomer (III) causes the particle shape of the thermally expandable microcapsule to be distorted, resulting in reduction in bulk density. The reduction in bulk density is likely to cause shearing on the thermally expandable microcapsule upon producing a masterbatch pellet in the subsequent process especially by extrusion molding. Thus, the thermally expandable microcapsule foams, a masterbatch shows problems such as poor true density, and a stable masterbatch fails to be produced. Consequently, the subsequent foam molding by injection molding or the like molding technique tends to cause unstableness of the expansion ratios. In the present invention, the reduction in bulk density can be prevented by setting the amount of the polymerizable monomer (III) to 0.2% by weight or less. The desirable lower limit of the amount of the polymerizable monomer (III) is 0% by weight, and the more desirable upper limit thereof is 0.1% by weight.

The monomer mixture (2) desirably contains the metal cation hydroxide (IV).

When the monomer mixture (2) contains the metal cation hydroxide (IV), the metal cation hydroxide (IV) is ionically bound with the carboxyl group of the radically-polymerizable unsaturated carboxylic acid monomer (II), resulting in an increase in rigidity and heat resistance. Consequently, it is possible to produce a thermally expandable microcapsule which neither bursts nor contracts for a long period of time at high temperatures. Since the elastic modulus of the shell is less likely to decrease even at high temperatures, a thermally expandable microcapsule neither bursts nor contracts even upon performing molding processes involving high shearing force, such as kneading molding, calender molding, extrusion molding, and injection molding.

Since the carboxyl group of the radically-polymerizable unsaturated carboxylic acid monomer (II) and the metal cation hydroxide (IV) are ionically bonded, not covalently bonded, the particle shape of the thermally expandable microcapsule is close to a perfect sphere and less likely to be distorted. This is because crosslinking by an ionic bond exhibits lower bonding strength than crosslinking by a covalent bond, and thus the volume of the thermally expandable microcapsule uniformly contracts upon polymerization of the monomers.

The metal cation of the metal cation hydroxide (IV) is not particularly limited as long as it reacts with the radically-polymerizable unsaturated carboxylic acid monomer (II) and is ionically bound therewith. Examples thereof include ions of metals such as Na, K, Li, Zn, Mg, Ca, Ba, Sr, Mn, Al, Ti, Ru, Fe, Ni, Cu, Cs, Sn, Cr, and Pb. However, the object in this case is to ionically bind the metal cation with the radically-polymerizable unsaturated carboxylic acid monomer (II). Thus, the metal cation needs to be hydroxide, and chlorides, such as NaCl, are not suitable because they form a weak ionic bond. Of these, the ions of Ca, Zn, and Al, which are divalent or trivalent metal cations, are desirable, and the ion of Zn is particularly desirable. These metal cation hydroxides (IV) may be used independently or two or more thereof may be used in combination.

The desirable lower limit of the amount of the metal cation hydroxide (IV) in the monomer mixture (2) is 0.1% by weight, and the desirable upper limit thereof is 10% by weight. The amount of the metal cation hydroxide (IV) of less than 0.1% by weight may result in insufficient heat resistance, whereas the amount of the metal cation hydroxide (IV) exceeding 10% by weight may markedly deteriorate the expansion ratio. The more desirable lower limit of the amount of the metal cation hydroxide (IV) is 0.5% by weight, and the more desirable upper limit thereof is 5% by weight.

The monomer mixture (3) contains: 40 to 90% by weight of at least one polymerizable monomer (I) selected from the group consisting of acrylonitrile, methacrylonitrile, and vinylidene chloride; 5 to 50% by weight of the radically-polymerizable unsaturated $C_{3-8}$ carboxylic acid monomer (II) having a carboxyl group; and 0.1 to 10% by weight of the metal cation hydroxide (IV), and the monomer mixture is free from the polymerizable monomer (III) having two or more double bonds in a molecule.

The monomer mixture (3) is free from the polymerizable monomer (III) having two or more double bonds in a molecule.

If crosslinking by an ionic bond between the radically-polymerizable unsaturated carboxylic acid monomer (II) and the metal cation hydroxide (IV) provides a shell having sufficient strength and heat resistance even when the monomer mixture is free from the polymerizable monomer (III) having two or more double bonds in a molecule. When the polymerizable monomer (III) is added to the monomer mixture, the particle shape of the thermally expandable microcapsule is distorted, resulting in reduction in bulk density. The reduction in bulk density is likely to cause shearing on the thermally expandable microcapsule upon producing a masterbatch pellet in the subsequent process especially by extrusion molding. Thus, the thermally expandable microcapsule foams, a masterbatch shows problems such as poor true density, and a stable masterbatch fails to be produced. Consequently, the subsequent foam molding by injection molding or the like molding technique tends to cause unstableness of the expansion ratios.

In the monomer mixture (3), crosslinking by an ionic bond mainly occurs and crosslinking by a covalent bond less occurs. Thus, the thermally expandable microcapsule having sufficient strength and heat resistance can be obtained without the polymerizable monomer (III) having two or more double bonds in the molecule. The phrase "the monomer mixture free from the polymerizable monomer (III) having two or more double bonds in a molecule" used herein refers to a monomer mixture substantially free from the polymerizable monomer (III), and a monomer mixture containing only a small amount of the polymerizable monomer (III) is regarded as a monomer mixture free from the polymerizable monomer (III).

The monomer mixture may contain other monomers as well as the polymerizable monomer (I), and the radically-polymerizable unsaturated carboxylic acid monomer (II). Examples of other monomers include acrylates such as methyl acrylate, ethyl acrylate, butyl acrylate, and dicyclopentenyl acrylate; methacrylates such as methyl methacrylate, ethyl methacrylate, butyl methacrylate, and isobornyl methacrylate; and vinyl monomers such as vinyl acetate and styrene. These other monomers may be suitably selected according to the characteristics required for the thermally expandable microcapsules. Desirable among these are methyl methacrylate, ethyl methacrylate, and methyl acrylate. The total amount of other monomers in all the monomers forming the shell is desirably less than 10% by weight. The amount of other monomers exceeding 10% by weight undesirably tends to cause reduction in gas barrier properties, and thus to deteriorate thermal expansion.

In order to polymerize the aforementioned monomers, the monomer mixture contains a polymerization initiator.

Suitable examples of the polymerization initiator include dialkyl peroxides, diacyl peroxides, peroxyesters, peroxydicarbonates, and azo compounds. Specific examples thereof include dialkyl peroxides such as methyl ethyl peroxide, di-t-butyl peroxide, and dicumyl peroxide; diacyl peroxides such as isobutyl peroxide, benzoyl peroxide, 2,4-dichlorobenzoyl peroxide, 3,5,5-trimethylhexanoyl peroxide; peroxyesters such as t-butyl peroxypivalate, t-hexyl peroxypivalate, t-butyl peroxyneodecanoate, t-hexyl peroxyneodecanoate, 1-cyclohexyl-1-methylethyl peroxyneodecanoate, 1,1,3,3-tetramethylbutyl peroxyneodecanoate, cumyl peroxyneodecanoate, and ($\alpha,\alpha$-bis-neodecanoylperoxy)diisopropylbenzene; peroxy dicarbonates such as bis(4-t-butyl cyclohexyl)peroxy dicarbonate, di-n-propyl-oxydicarbonate, di-isopropyl peroxydicarbonate, di(2-ethylethylperoxy)dicarbonate, dimethoxybutyl peroxy dicarbonate, and di(3-methyl-3-methoxybutylperoxy)dicarbonate; and azo compounds such as 2,2'-azobisisobutyronitrile, 2,2'-azobis(4-methoxy-2,4-dimethylvaleronitrile), 2,2'-azobis(2,4-dimethylvaleronitrile), and 1,1'-azobis-(1-cyclohexanecarbonitrile).

The desirable lower limit of the weight-average molecular weight of the polymer that forms the shell is 100,000, and the desirable upper limit thereof is 2,000,000. The weight-average molecular weight of less than 100,000 may cause low strength of the shell, whereas the weight-average molecular weight exceeding 2,000,000 may cause extremely high strength of the shell, likely resulting in reduction in the expansion ratio.

If necessary, the shell may further contain a stabilizer, an ultraviolet absorber, an antioxidant, an antistatic agent, a flame retardant, a silane coupling agent, a coloring agent, or the like.

The thermally expandable microcapsule comprises a shell and a volatile expansion agent as a core agent encapsulated in the shell.

The volatile expansion agent is a substance that can change to a gas state at the softening temperature or lower of the polymer that forms the shell. A low-boiling-point organic solvent is suitable as the volatile expansion agent.

Examples of the volatile expansion agent include low molecular-weight hydrocarbons such as ethane, ethylene, propane, propene, n-butane, isobutane, butene, isobutene, n-pentane, isopentane, neopentane, n-hexane, heptane, and petroleum ether; chlorofluorocarbons such as $CCl_3F$, $CCl_2F_2$, $CClF_3$, and $CClF-CClF_2$; and tetraalkylsilanes such as tetramethylsilane, trimethylethylsilane, trimethylisopropylsilane, and trimethyl-n-propylsilane. Desirable among these are isobutane, n-butane, n-pentane, isopentane, n-hexane, petroleum ether, and mixtures thereof. These volatile expansion agents may be used independently, or two or more thereof may be used in combination.

A thermally decomposable compound, which is thermally decomposed by heating to become a gas, may be used as the volatile expansion agent.

Of the above-mentioned volatile expansion agents, a low-boiling-point hydrocarbon having five or less carbon atoms is desirably used in the thermally expandable microcapsule. Such a hydrocarbon provides a thermally expandable microcapsule that has a high expansion ratio and immediately starts foaming rapidly.

The thermally decomposable compound, which is thermally decomposed by heating to become a gas, may be used as a volatile expansion agent.

In the masterbatch for foam molding of the present invention, the desirable lower limit of the amount of the volatile expansion agent used as a core agent is 10% by weight, and the desirable upper limit thereof is 25% by weight.

The thickness of the shell changes with the amount of the core agent. When the amount of the core agent is reduced and the shell becomes too thick, foaming performance is deteriorated. When the amount of the core agent is increased, the strength of the shell is decreased. When the amount of the core agent is 10 to 25% by weight, it is possible to simultaneously prevent deformation and improve foaming performance of a thermally expandable microcapsule.

The desirable lower limit of the maximum foaming temperature (Tmax) of the thermally expandable microcapsule is 180° C. If the maximum foaming temperature is less than 180° C., the thermally expandable microcapsule may be poor in heat resistance, and thus the microcapsule tends to burst and contract at high temperatures or in the molding process. In addition, the thermally expandable microcapsule may be made to foam due to shearing upon the production of masterbatch pellets. Thus, an unfoamed masterbatch pellet cannot be stably produced. The desirable lower limit of the maximum foaming temperature is 190° C.

The maximum foaming temperature used herein refers to a temperature at which the diameter of the thermally expandable microcapsule is the maximum (maximum displacement amount) while the thermally expandable microcapsule is heated from an ordinary temperature.

The desirable lower limit of the volume average particle diameter of the thermally expandable microcapsules is 5 μm, and the desirable upper limit thereof is 100 μm. When the volume average particle diameter is less than 5 μm, bubbles of the molding product to be obtained are so small that reduction in weight of the molding product may be insufficient. When the volume average particle diameter exceeds 100 μm, bubbles in the molding product to be obtained are so large that problems may arise in terms of properties such as strength. The more desirable lower limit of the volume average particle diameter is 10 μm, and the more desirable upper limit thereof is 40 μm.

The lower limit of the bulk density of the thermally expandable microcapsule is 0.40 g/cm$^3$. If the bulk density is less than 0.40 g/cm$^3$, the thermally expandable microcapsule is more likely to be sheared and thus is made to slightly expand upon the production of masterbatch pellets, especially by extrusion molding. Consequently, problems such as reduction in the true density of a masterbatch occur and a stable masterbatch may not be produced. This tends to cause unstableness of the expansion ratios upon the subsequent foam molding by injection molding or the like molding technique. The desirable lower limit of the bulk density is 0.42 g/cm$^3$.

The bulk density refers to a specific gravity based on the volume of an aggregate of thermally expandable microcapsules arranged in closest packing in a container, etc. The bulk density can be measured in conformity with JIS K 6721.

The method for producing the thermally expandable microcapsule is not particularly limited. For example, the thermally expandable microcapsule may be produced by the steps of preparing an aqueous medium; dispersing, in the aqueous medium, an oily mixture containing 40 to 90% by weight of at least one polymerizable monomer (I) selected from the group consisting of acrylonitrile, methacrylonitrile, and vinylidene chloride, 5 to 50% by weight of the $C_{3-8}$ radically-polymerizable unsaturated carboxylic acid monomer (II) having a carboxyl group, and a volatile expansion agent; and polymerizing the monomers.

Upon producing the thermally expandable microcapsule, the step of preparing an aqueous medium is first performed. Specifically, for example, water and a dispersion stabilizer, and an auxiliary stabilizer if necessary, are put in a polymerization vessel to prepare an aqueous dispersion medium containing a dispersion stabilizer. Alkali metal salts of nitrous acid, stannous chloride, stannic chloride, potassium dichromate, and the like may be added therein as needed.

Examples of the dispersion stabilizer include silica, calcium phosphate, magnesium hydroxide, aluminum hydroxide, ferric hydroxide, barium sulfate, calcium sulfate, sodium sulfate, calcium oxalate, calcium carbonate, calcium carbonate, barium carbonate, and magnesium carbonate.

The amount of the dispersion stabilizer is not particularly limited and appropriately determined by the kind of dispersion stabilizer, a particle diameter of the thermally expandable microcapsule, and the like. The desirable lower limit thereof is 0.1 parts by weight, and the desirable upper limit thereof is 20 parts by weight, with respect to 100 parts by weight of the monomers.

Examples of the auxiliary stabilizer include a condensation product of diethanolamine and aliphatic dicarboxylic acid, a condensation product of urea and formaldehyde, polyvinyl pyrrolidone, polyethylene oxide, polyethylene imine, tetramethylammonium hydroxide, gelatin, methyl cellulose, polyvinyl alcohol, dioctyl sulfosuccinate, sorbitan ester, and various emulsifiers.

In addition, combinations of the dispersion stabilizer and the auxiliary stabilizer are not particularly limited, and examples thereof include a combination of colloidal silica and a condensation product, a combination of colloidal silica and a water-soluble nitrogen-containing compound, and a combination of magnesium hydroxide or calcium phosphate and an emulsifier. Of them, the combination of colloidal silica and a condensation product is desirable.

Further, as the condensation product, a condensation product of diethanolamine and aliphatic dicarboxylic acid is desirable, and a condensation product of diethanolamine and adipic acid and a condensation product of diethanolamine and itaconic acid are particularly desirable.

Examples of the water-soluble nitrogen-containing compound include polyvinylpyrrolidone, polyethyleneimine, polyoxyethylene alkylamine, polydialkylaminoalkyl (meth) acrylates typified by polydimethylaminoethylmethacrylate and polydimethylaminoethylacrylate, polydialkylaminoalkyl (meth) acrylamides typified by polydimethylaminopropylacrylamide and polydimethylaminopropylmethacrylamide, polyacrylamide, polycationicacrylamide, polyaminesulfone, and polyallylamine. Of them, polyvinylpyrrolidone is desirably used.

The amount of the colloidal silica is appropriately determined by the particle diameter of the thermally expandable microcapsule. The desirable lower limit thereof is 1 part by weight, and the desirable upper limit thereof is 20 parts by weight, with respect to 100 parts by weight of vinyl monomers. The more desirable lower limit of the amount of the colloidal silica is 2 parts by weight, and the more desirable upper limit thereof is 10 parts by weight. In addition, the amount of the condensation product or the water-soluble nitrogen-containing compound is also appropriately determined by the particle diameter of the thermally expandable microcapsule. The desirable lower limit thereof is 0.05 parts by weight, and the desirable upper limit thereof is 2 parts by weight, with respect to 100 parts by weight of the monomers.

In addition to the dispersion stabilizer and the auxiliary stabilizer, inorganic salts such as sodium chloride and sodium sulfate may be added. Addition of the inorganic salts provides thermally expandable microcapsules each having a more uniform particle shape. Normally, the amount of the inorganic salt is desirably 0 to 100 parts by weight with respect to 100 parts by weight of the monomers.

The aqueous dispersion medium containing the dispersion stabilizer is prepared by blending a dispersion stabilizer and an auxiliary stabilizer with deionized water. The pH of the water phase in this case is appropriately determined by the kind of dispersion stabilizer and auxiliary stabilizer to be used. For example, if silica such as colloidal silica is used as a dispersion stabilizer, polymerization is performed in an acidic medium. Otherwise, if an aqueous medium is to be acidified, an acid such as hydrochloric acid is added according to need, to adjust the pH of the system within the range of 3 to 4. Meanwhile, upon use of magnesium hydroxide or calcium phosphate, polymerization is performed in an alkaline medium.

The following step in the method for producing a thermally expandable microcapsule is a step of dispersing, in the aqueous medium, an oily mixture containing 40 to 90% by weight of at least one polymerizable monomer (I) selected from the group consisting of acrylonitrile, methacrylonitrile, and vinylidene chloride, 5 to 50% by weight of the $C_{3-8}$ radically-polymerizable unsaturated carboxylic acid monomer monomer(II) having) having a carboxyl group, and the volatile expansion agent. In this step, the oily mixture may be prepared in the aqueous dispersion medium by separately adding monomers and the volatile expansion agent to the aqueous dispersion medium. However, both are usually mixed beforehand to produce an oily mixture, and subsequently added to an aqueous dispersion medium. In this case, the oily mixture and the aqueous dispersion medium may be prepared beforehand in two separate containers. Then, the oily mixture and aqueous dispersion medium are mixed to prepare a dispersion of the oily mixture in the aqueous dispersion medium. The thus-prepared dispersion is then added to a polymerization vessel.

Here, a polymerization initiator is used for polymerizing the monomers. The polymerization initiator may be added to the oily mixture beforehand, or may be added thereto after stirring and mixing the aqueous dispersion medium and the oily mixture in the polymerization vessel.

The oily mixture may be emulsion-dispersed in an aqueous dispersion medium with a predetermined particle diameter by, for example, stirring the oily mixture and the medium with a homomixer (a homomixer produced by PRIMIX Corporation, for example) or introducing the oily mixture and the medium into a static dispersion apparatus such as a line mixer and an element-type static dispersion machine.

The aqueous dispersion medium and the polymerizable mixture may be separately supplied to the static dispersion apparatus, or they may be mixed and stirred beforehand to form a dispersion, and then the dispersion may be supplied thereto.

The thermally expandable microcapsule can be produced by heating the dispersion obtained through the aforementioned process to thereby polymerize monomers, for example. The thermally expandable microcapsule produced by such a method has a high maximum foaming temperature, excels in heat resistance, and neither bursts nor contracts at high temperatures or in the molding process. The thermally expandable microcapsule does not suffer from foaming caused by shearing upon producing a masterbatch pellet because of high bulk density, and thus an unfoamed masterbatch pellet can be stably produced.

The masterbatch for foam molding of the present invention may contain a chemical foaming agent. The masterbatch containing the chemical foaming agent, for example, a chemical foaming agent such as sodium bicarbonate can show improved foaming performance because of $CO_2$ generated when decomposed. When the thermally expandable microcapsule and the chemical foaming agent are concomitantly used, it is possible to suppress open cells that tend to be generated upon using the chemical foaming agent alone.

The chemical foaming agent is not particularly limited as long as it is in powder at an ordinary temperature, and conventionally widely used chemical foaming agents may be used. Specific examples thereof include inorganic chemical foaming agents, such as sodium hydrogen carbonate, and organic chemical foaming agents, such as azodicarbonamide, N,N'-dinitrosopentamethylenetetramine, P,P'-oxybis benzene sulfonylhydrazide, and paratoluene sulfonylhydrazide.

The masterbatch for foam molding of the present invention may contain additives such as a lubricant. When the masterbatch contains the lubricant, the shearing force applied to the thermally expandable microcapsule upon production of a masterbatch is controlled, and slight expansion is less likely to be generated. In addition, the dispersibility of the thermally expandable microcapsule can be improved, and a masterbatch is easily produced. Consequently, a masterbatch with a high concentration of the thermally expandable microcapsule can be stably produced with good production efficiency.

The lubricant is not particularly limited as long as it dissolves at temperatures upon production of a masterbatch, and conventionally widely used lubricants may be used. Specific examples thereof include fatty acid esters of glycerol, such as polyethylene wax, glycerol monostearate, and diglycerol stearate, each having a viscosity-average molecular weight of 3,000 or less; fatty acids such as stearic acid; and composite lubricants.

The lower limit of the true density of the masterbatch pellet for foam molding according to the present invention is 0.80 $g/cm^3$. A true density of less than 0.80 $g/cm^3$ means that the thermally expandable microcapsule in a masterbatch swells, and thus the expansion ratio of the molded product to be obtained after molding is low.

The desirable lower limit of the true density is 0.90 $g/cm^3$, and the desirable upper limit thereof is 1.0 $g/cm^3$.

The true density refers to a specific gravity of only the material except for pores, and indicates a ratio of the mass per unit volume of the masterbatch at 20° C. to the mass of water having the same volume at 4° C. The true density can be measured by a method based on Method A (water displacement method) of JIS K 7112.

The lower limit of the bulk density of the masterbatch pellet for foam molding according to the present invention is 0.35 $g/cm^3$. In molding processes, especially injection molding, the masterbatch is weighed so that the total volume should be constant. Thus, the bulk density of as low as less than 0.35 $g/cm^3$ leads to loss of the weight of the masterbatch, resulting in a low expansion ratio of the obtained molded product.

The desirable lower limit of the bulk density is 0.38 $g/cm^3$, and the desirable upper limit thereof is 0.50 $g/cm^3$.

The bulk density refers to a specific gravity based on the volume of an aggregate of thermally expandable microcapsules arranged in closest packing in a container.

The bulk density can be measured in conformity with JIS K 6721.

The lower limit of the masterbatch size of the masterbatch pellet for foam molding according to the present invention is 450 mg/30 pieces. When the masterbatch size is less than 450 mg/30 pieces, the masterbatch size is small. Thus, the surface area is increased, and a base resin dissolves earlier owing to the temperature and shearing in a molding machine. Consequently, the masterbatch pellet less shows the effect of increasing the melting point of the base resin in a masterbatch so as to prevent the thermally expandable microcapsule from foaming earlier in a cylinder.

The desirable lower limit of the masterbatch size is 470 mg/30 pieces, and the desirable upper limit thereof is 600 mg/30 pieces.

The masterbatch size is the standard of a masterbatch size, and is represented by the total weight of 30 masterbatches.

The masterbatch size can be determined by randomly collecting 30 masterbatches and measuring the weight thereof.

The method for producing the masterbatch for foam molding of the present invention is not particularly limited. Examples thereof include a method in which raw materials including a base resin such as a thermoplastic resin and additives such as a lubricant, are kneaded beforehand with an apparatus such as a same-direction twin-screw extruder; the mixture is heated to a predetermined temperature; foaming agents comprising thermally expandable microcapsules are added thereto; the mixture is further kneaded to provide a resultant mixture; and the resultant mixture is cut into a pellet shape having a desired size with a pelletizer to give a masterbatch pellet. When the thermally expandable microcapsules slightly expand, a desired expansion ratio is less likely to be obtained in the subsequent foam molding, resulting in more unstable expansion ratios.

The masterbatch may be alternatively produced by a method, including kneading raw materials including a base resin, thermally expandable microcapsules, and a lubricant with a batch-type kneader, subsequent glanulating the mixture with a granulator, to produce a masterbatch pellet in a pellet shape with an extruder and a pelletizer.

The kneader is not particularly limited as long as it is able to knead the raw materials without breaking the thermally expandable microcapsules. Examples thereof include a pressurizing kneader and a Banbury mixer.

A foamed product can be produced by charging a resin composition which contains the masterbatch for foam molding of the present invention and a matrix resin such as a thermoplastic resin, then molding an article by a molding method such as injection molding, and heating the article, during the process of molding, to make the thermally expandable microcapsules foam, to thereby produce a foamed product. Such a foamed product is also one aspect of the present invention.

The foamed product of the present invention obtained by such a method has a high expansion ratio and a good appearance. Closed cells are uniformly formed therein. The foamed product excels in properties such as lightness, heat insulation, shock resistance, and rigidity, and thus may be suitably used for applications such as building materials for residence, members for automobiles, and shoe soles.

The matrix resin, such as the thermoplastic resin, is not particularly limited as long as it does not provide any adverse effect for attaining the present invention. Examples thereof include general thermoplastic resins such as polyvinyl chloride, polystyrene, polypropylene, polypropylene oxide, and polyethylene; and engineering plastics such as polybutylene terephthalate, nylon, polycarbonate, and polyethylene terephthalate. Thermoplastic elastomers such as ethylene elastomers, vinyl chloride elastomers, olefin elastomers, urethane elastomers, and ester thermoplastic elastomers, may be used. Alternatively, these resins may be used in combination.

The amount of the masterbatch for foam molding according to the present invention is desirably 0.5 to 20 parts by weight, and more desirably 1 to 10 parts by weight to 100 parts by weight of the thermoplastic resin.

The method for molding a foamed product of the present invention is not particularly limited, and examples thereof include kneading molding, calender molding, extrusion molding, and injection molding. Methods of injection molding are not particularly limited. Examples of the methods include a short shot method in which part of a resin material is charged in a mold and then foamed, and a core back method in which a resin material is fully charged in a die and thereafter the die volume is expanded in order to allow the resin material to foam in a desired size.

Examples of the applications of the molded product obtained in the method for molding a foamed product according to the present invention include automotive interior materials, such as door trims and instrument panels (IPs), and automotive exterior materials, such as bumpers. Examples thereof also include applications of building materials such as wood plastics, shoe soles, and artificial corks.

Effects Of The Invention

According to the present invention, it is possible to provide a masterbatch for foam molding, which can be suitably used for molding processes involving high shearing force, such as kneading molding, calender molding, extrusion molding, and injection molding, which shows a high expansion ratio, and which yields a foamed product with a good appearance. It is also possible to provide a foamed product using the masterbatch for foam molding.

MODE FOR CARRYING OUT THE INVENTION

Hereinafter, the present invention will be described in further detail referring to the following examples. The present invention is not limited to these examples.

Examples 1 to 10, and Comparative Examples 1 to 7

(Production of Thermally Expandable Microcapsule)

300 parts by weight of water, 89 parts by weight of sodium chloride as a regulator, 0.07 parts by weight of sodium nitrite as a water-soluble polymerization inhibitor, 8 parts by weight of colloidal silica (produced by ADEKA CORPORATION), and 0.3 parts by weight of polyvinylpyrrolidone (produced by BASF SE) as a dispersion stabilizer were charged in a polymerization vessel to prepare an aqueous dispersion medium. Subsequently, an oily mixture containing metal cation hydroxide, monomers, volatile expansion agents, and polymerization initiators, each in an amount shown in Table 1, were added to the aqueous dispersion medium to prepare a dispersion. The total amount of the dispersion was 15 kg. The obtained dispersion was stirred and mixed with a homogenizer. The dispersion was fed into a nitrogen-substituted pressure polymerization vessel (20 L). Pressure was applied thereto (0.2 MPa), and the dispersion was reacted at 60° C. for 20 hours to prepare a reaction product. The resultant product was dehydrated and water-washed repeatedly in a centrifugal separator, followed by drying to produce thermally expandable microcapsules (No. 1 to 7).

In Table 1, the monomer (I), monomer (II), and monomer (III) express a polymerizable monomer (I), radically-polymerizable unsaturated carboxylic acid monomer (II), and polymerizable unsaturated monomer (III), respectively.

(Production of Masterbatch Pellet)

A masterbatch pellet was obtained by kneading 100 parts by weight of base resin shown in Table 2 and 10 parts by weight of stearic acid as a lubricant with a Banbury mixer; adding, when the temperature reached about 100° C., the thermally expandable microcapsules in an amount shown in Table 2; then kneading the mixture for further 30 seconds; and extruding the resultant mixture while palletizing, to produce the materbatch pellet. In Comparative Example 7, the speed of the cutter (pelletizer) upon pelletizing was 1.2 times as high as those in other examples and comparative examples, and thereby the pellet size was decreased (Table 2 shows the masterbatch size indicating the pellet size). In Table 2, LDPE, PP, EVA, and EMMA express low-density polyethylene, polypropylene, an ethylene-vinyl acetate copolymer, and an ethylene-methyl methacrylate copolymer; respectively.
(Production of Molding Product)

A plate-like molding product was obtained by mixing a masterbatch pellet in an amount shown in Table 2 with 100 parts by weight of polypropylene resin; charging the obtained mixed pellet into a hopper of a screw-type injection molding apparatus provided with an accumulator; melting and kneading the charged pellet therein; and injection molding the kneaded pellet. The molding conditions were a temperature of the cylinder of 200° C., and an injection speed of 60 mm/sec, a delay time of die opening of 0 second, and a die temperature of 40° C.
(Evaluation)

The thermally expandable microcapsules (No. 1 to 7) and molding products obtained in Examples 1 to 10 and Comparative Examples 1 to 7 were evaluated for the following performances. Tables 1 and 2 show the results.
(1) Evaluation of Thermally Expandable Microcapsule
(1-1) Volume Average Particle Diameter The volume average particle diameter of each microcapsule was measured with a particle size distribution analyzer (LA-910, produced by HORIBA, Ltd.).
(1-2) Foaming Starting Temperature, Maximum Foaming Temperature, and Maximum Displacement Amount The foaming starting temperature (Ts), the maximum displacement amount (Dmax), and the maximum foaming temperature (Tmax) were measured with a thermomechanical analyzer (TMA) (TMA2940, produced by TA instruments). Specifically, 25 μg of a test sample was put in an aluminum container with a diameter of 7 mm and a depth of 1 mm, and heated from 80° C. to 220° C. at a temperature-rise rate of 5° C./min with a force of 0.1 N applied from the top. Thus, displacement was measured in a perpendicular direction of a measuring terminal. The temperature at which the displacement began to increase was defined as the foaming starting temperature. The maximum value of the displacement was defined as the maximum displacement amount. The temperature at which the maximum displacement amount was measured was defined as the maximum foaming temperature.

(1-3) Measurement of Bulk Density

The bulk density of each materbatch was measured in conformity with JIS K 6721.

TABLE 1

| | | | Thermally expandable microcapsule No. | | | | | | |
|---|---|---|---|---|---|---|---|---|---|
| | | | (1) | (2) | (3) | (4) | (5) | (6) | (7) |
| Amount (parts by weight) | Monomer (I) | Acrylonitrile | 20 | 20 | 20 | 20 | 0 | 40 | 13 |
| | | Methacrylonitrile | 30 | 30 | 30 | 30 | 0 | 50 | 23 |
| | | Vinylidene chloride | 0 | 0 | 0 | 0 | 50 | 0 | 0 |
| | Monomer (II) | Methacrylic acid | 30 | 30 | 30 | 30 | 30 | 0 | 34 |
| | Other monomer | Methyl methacrylate | 20 | 20 | 20 | 20 | 20 | 10 | 30 |
| | Monomer (III) | Trimethylolpropane trimethacrylate | 0.2 | 0 | 0.1 | 0 | 0.2 | 0.1 | 0.8 |
| | Metal cation hydroxide (IV) | ZnOH | 0 | 0 | 1.5 | 0 | 0 | 0 | 1.5 |
| | | Al(OH)$_3$ | 0 | 0 | 0 | 1.5 | 0 | 0 | 0 |
| | Volatile expansion agent | Isopentane | 15 | 15 | 15 | 15 | 15 | 15 | 15 |
| | | Isooctane | 10 | 10 | 10 | 10 | 10 | 10 | 10 |
| | Polymerization initiator | 2,2'-Azobisisobutyronitrile | 0.8 | 0.8 | 0.8 | 0.8 | 0.8 | 0.8 | 0.8 |
| | | 2,2'-Azobis(4-methoxy-2,4-dimethylvaleronitrile) | 0.6 | 0.6 | 0.6 | 0.6 | 0.6 | 0.6 | 0.6 |
| Volume average particle diameter (μm) | | | 25 | 26 | 23 | 24 | 26 | 25 | 25 |
| Foaming starting temperature (Ts) (° C.) | | | 165 | 160 | 172 | 174 | 155 | 140 | 180 |
| Maximum foaming temperature (Tmax) (° C.) | | | 216 | 210 | 222 | 220 | 210 | 180 | 230 |
| Maximum displacement amount (Dmax) | | | 1250 | 1400 | 800 | 1200 | 1300 | 1100 | 750 |
| Bulk specific gravity (g/cm$^3$) | | | 0.430 | 0.510 | 0.465 | 0.495 | 0.480 | 0.475 | 12 |

(2) Evaluation of Masterbatch Pellet
(2-1) Measurement of True Density

The true density of the masterbatch pellet was measured by a method based on Method A (water displacement method) of JIS K 7112 with a densimeter MD-200S (produced by Alfa Mirage, Co., Ltd.).

(2-2) Measurement of Bulk Density

The bulk density of each materbatch was measured in conformity with JIS K 6721.

(2-3) Measurement of Masterbatch Size 30 pieces of the obtained masterbatch pellets were randomly collected, and the total weight thereof was measured.
(3) Evaluation of Molding Product
(3-1) Expansion Ratio The plate thickness of the molding product after foamed was divided by the plate thickness of the molding product before foamed, and the obtained value was defined as the expansion ratio. Then, the average value and standard deviation of the expansion ratios of ten molding products were determined.

(3-2) A (Surface and Cross Section of Molding Product)

The appearance in the cross section of the molding product was visually observed.

(3-3) Measurement of Density

The specific gravity of the obtained molding product was measured by a method based on Method A (underwater substitution method) of JIS K 7112.

TABLE 2

|  |  | Examples | | | | | | | | |
|---|---|---|---|---|---|---|---|---|---|---|
|  |  | 1 | 2 | 3 | 4 | 5 | 6 | 7 | 8 | 9 |
| Thermally expandable microcapsule No. | | (1) | (2) | (3) | (4) | (5) | (6) | (3) | (1) | (1) |
| Base resin for masterbatch | Type | LDPE | LDPE | LDPE | LDPE | LDPE | LDPE | LDPE | LDPE | LDPE |
|  | Melting point (° C.) | 103 | 103 | 103 | 103 | 103 | 103 | 103 | 107 | 122 |
| Amount of thermally expandable microcapsule to 100 parts by weight of base resin in masterbatch (parts by weight) | | 100 | 100 | 100 | 100 | 100 | 100 | 150 | 100 | 100 |
| Amount of masterbatch to 100 parts by weight of polypropylene resin in molding product (parts by weight) | | 5 | 5 | 5 | 5 | 5 | 5 | 5 | 5 | 5 |
| Evaluation of masterbatch | True density (g/cm$^3$) | 0.960 | 0.975 | 0.960 | 0.940 | 0.950 | 0.960 | 0.905 | 0.940 | 0.940 |
|  | Buk density (g/cm$^3$) | 0.400 | 0.410 | 0.420 | 0.420 | 0.450 | 0.390 | 0.460 | 0.380 | 0.400 |
|  | Masterbatch size (mg/30 pieces) | 470 | 500 | 520 | 480 | 490 | 480 | 600 | 480 | 470 |
| Evaluation of molding product | Expansion ratio (times) | 2.1 | 2.3 | 2.5 | 2.45 | 2 | 2.4 | 2.1 | 2.7 | 2.6 |
|  | Density (g/ml) | 0.49 | 0.46 | 0.43 | 0.45 | 0.505 | 0.46 | 0.495 | 0.4 | 0.415 |
|  | Appearance — Surface appearance | Smooth | Smooth | Smooth | Smooth | Smooth | Smooth | Smooth | Smooth | Smooth |
|  | Appearance in cross section | Closed cell | Closed cell | Closed cell | Closed cell | Closed cell | Closed cell | Closed cell | Closed cell | Closed cell |

|  |  | Examples | Comparative Examples | | | | | | |
|---|---|---|---|---|---|---|---|---|---|
|  |  | 10 | 1 | 2 | 3 | 4 | 5 | 6 | 7 |
| Thermally expandable microcapsule No. | | (1) | (1) | (3) | (3) | (3) | (3) | (7) | (7) |
| Base resin for masterbatch | Type | PP | EVA | EVA | EMMA | LDPE | LDPE | LDPE | LDPE |
|  | Melting point (° C.) | 142 | 82 | 82 | 67 | 103 | 103 | 103 | 103 |
| Amount of thermally expandable microcapsule to 100 parts by weight of base resin in masterbatch (parts by weight) | | 100 | 100 | 100 | 100 | 5 | 250 | 100 | 100 |
| Amount of masterbatch to 100 parts by weight of polypropylene resin in molding product (parts by weight) | | 5 | 5 | 5 | 5 | 5 | 5 | 5 | 5 |
| Evaluation of masterbatch | True density (g/cm$^3$) | 0.930 | 0.920 | 0.880 | 0.910 | 0.875 | Impossible to form masterbatch | 0.750 | 0.767 |
|  | Buk density (g/cm$^3$) | 0.410 | 0.390 | 0.400 | 0.410 | 0.420 |  | 0.308 | 0.325 |
|  | Masterbatch size (mg/30 pieces) | 500 | 420 | 450 | 400 | 450 |  | 455 | 380 |
| Evaluation of molding product | Expansion ratio (times) | 2.1 | 1.4 | 1.75 | 1.3 | 1.1 |  | 1.3 | 1.2 |
|  | Density (g/ml) | 0.495 | 0.8 | 0.7 | 0.85 | 0.885 |  | 0.850 | 0.880 |
|  | Appearance — Surface appearance | Smooth | Remarkably coarse like particles | Remarkably coarse like particles | Remarkably coarse like particles | Curved |  | Remarkably coarse like particles | Remarkably coarse like particles |
|  | Appearance in cross section | Closed cell | Closed cell | Closed cell | Closed cell | Closed cell |  | Open cell | Open cell |

As shown in Table 2, the molding products obtained in Examples 1 to 10 each had a high expansion ratio and a good appearance. In the cross section, cells were uniformly formed as closed cells. The molding products obtained in Comparative Examples 1 to 3 each had a poor surface appearance and exhibited a low expansion ratio. The molding product obtained in Comparative Example 4 exhibited an extremely low expansion ratio. In Comparative Example 5, it was impossible to produce a masterbatch. In Comparative Example 6, a thermally expandable microcapsule No. 7 having a low bulk density was used. Thus, a masterbatch was slightly expanded, and consequently had a low true density and a low bulk density. In addition, the molding product had a poor surface appearance and a low expansion ratio. In Comparative Example 7, the masterbatch had a low true density and a low bulk density, as well as a small pellet size. Thus, the molded product had a poorer appearance and a lower expansion ratio.

INDUSTRIAL APPLICABILITY

According to the present invention, it is possible to provide a masterbatch for foam molding, which can be suitably used for molding processes involving high shearing force, such as kneading molding, calender molding, extrusion molding, and injection molding, which shows a high expansion ratio, and which yields a foamed product with a good appearance. It is also possible to provide a foamed product using the masterbatch for foam molding.

The invention claimed is:
1. A masterbatch for foam molding,
which comprises a base resin and a thermally expandable microcapsule,
said base resin being a thermoplastic resin having a melting point of 100° C. or higher,
said masterbatch containing 100 to 230 parts by weight of said thermally expandable microcapsule to 100 parts by weight of said base resin, and
said masterbatch having a true density of 0.90 to 1.0 g/cm$^3$, a bulk density of 0.35 to 0.5 g/cm$^3$, and a masterbatch size of 450 to 600 mg/30 pieces,
wherein the thermally expandable microcapsule comprises:
a shell and a volatile expansion agent as a core agent encapsulated in the shell, and said shell comprises a polymer obtained by polymerizing a monomer mixture which contains 40 to 90% by weight of at least one polymerizable monomer (I) selected from the group consisting of acrylonitrile, methacrylonitrile, and vinylidene chloride;

5 to 50% by weight of radically-polymerizable unsaturated $C_{3-8}$ carboxylic acid monomer (II) having a carboxyl group; and 0.1 to 10% by weight of metal cation hydroxide (IV), said monomer mixture is free from a polymerizable monomer (III) having two or more double bonds in a molecule other than the radically-polymerizable unsaturated $C_{3-8}$ carboxylic acid monomer (II) having a carboxyl group, and said metal cation hydroxide (IV) is $Al(OH)_3$.

2. The masterbatch for foam molding according to claim 1, wherein the base resin is at least one selected from the group consisting of low-density polyethylene, high-density polyethylene, polypropylene, and polystyrene.

3. The masterbatch for foam molding according to claim 1, wherein the maximum foaming temperature of the thermally expandable microcapsule is 180° C. or higher.

4. A foamed product, which is produced from the masterbatch for foam molding according to claim 1.

5. The masterbatch for foam molding according to claim 2, wherein a maximum foaming temperature of the thermally expandable microcapsule is 180° C. or higher.

6. A foamed product, which is produced from the masterbatch for foam molding according to claim 2.

7. A foamed product, which is produced from the masterbatch for foam molding according to claim 3.

* * * * *